C. ELLIS.
PROCESS OF BURNING CEMENT CLINKER.
APPLICATION FILED APR. 7, 1906.
918,025.
Patented Apr. 13, 1909.
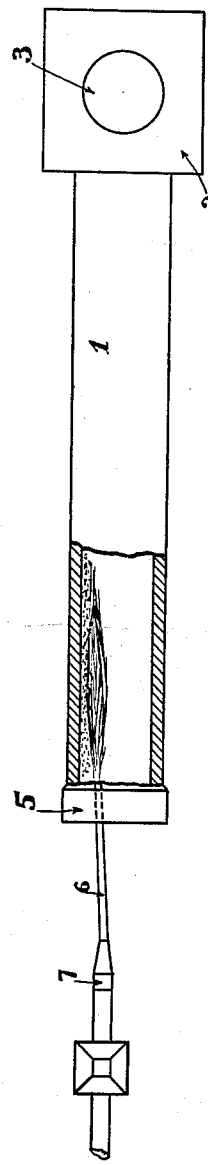
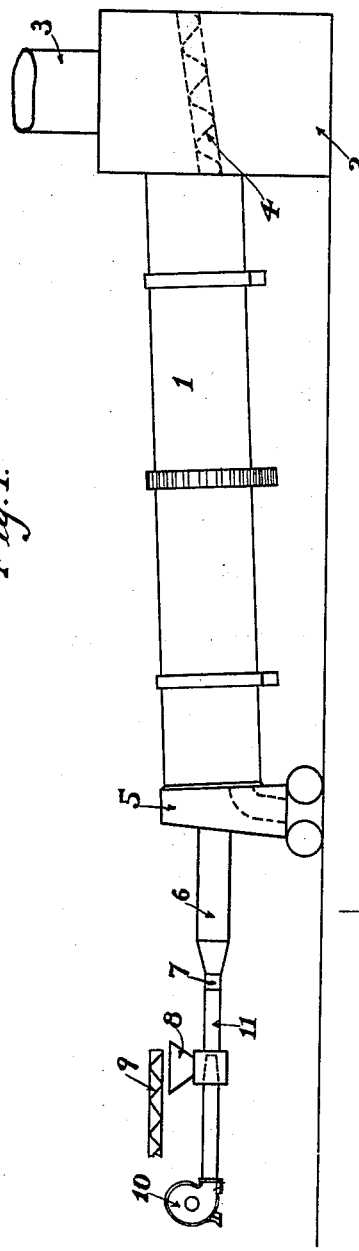
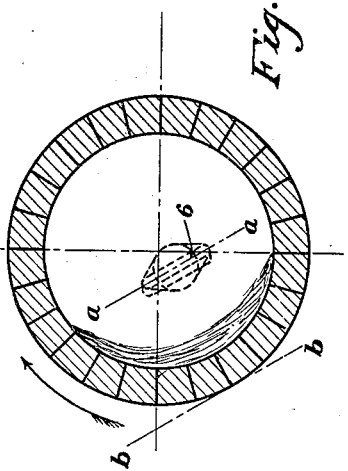
WITNESSES:
F. U. Chamberlain.
Geo. H. Landfear.
INVENTOR
Carleton Ellis.

UNITED STATES PATENT OFFICE.

CARLETON ELLIS, OF WHITE PLAINS, NEW YORK.

PROCESS OF BURNING CEMENT CLINKER.

No. 918,025.    Specification of Letters Patent.    Patented April 13, 1909.

Application filed April 7, 1906. Serial No. 310,562.

*To all whom it may concern:*

Be it known that I, CARLETON ELLIS, a citizen of the United States, and a resident of White Plains, in the county of Westchester and State of New York, have invented certain new and useful Improvements in Processes of Burning Cement Clinker, of which the following is a specification.

This invention relates to process of burning cement in inclined rotary kilns with powdered coal as a fuel.

It has been a desideratum in the cement industry to secure a flame impinging upon the material in the manufacture of Portland cement clinker. This has heretofore been impossible owing to the fact that the flame produced by burning powdered coal with ordinary air is of too high a temperature and acts destructively upon the lining or coating of the kiln besides burning the clinker unevenly. Because of this among other reasons the flame has been introduced into the kiln parallel to the axis, and heating is effected by radiation. The flame is brought as near to the material as possible consistent with avoidance of the above mentioned destructive action on the kiln lining. It even at times impinges very slightly, especially as there is considerable fluctuation in the size of the flame from various causes and occasionally the outer portion of the flame will temporarily bathe the material, due to such fluctuation, but ordinarily the flame cannot be brought into direct contact with the material and radiated heat is therefore depended upon for the maintenance of the clinkering temperature. Very recent practice has made possible the impingement of flame by the use of diluent gas. This is an advantageous method of applying the flame and results in increased output of the kiln and considerable economy of fuel. Its one disadvantage is the extra cost of apparatus required which is of some moment especially with the long kilns now coming into use. Dust chambers and great length of flues are required to convey the stack gases, which are customarily employed, from the upper to the lower end of the kiln.

It is the object of my invention to burn Portland cement clinker with an impinging flame using ordinary or fresh air as the supporter of combustion without dilution in any way and with minimum cost and complexity of apparatus.

My invention consists in burning the cement clinker with an impinging flame produced by the combustion of a flattened stream of powdered fuel and ordinary air, the latter being in amount sufficient, if necessary, to support combustion, although I do not necessarily depend wholly upon the air so introduced for the completion of combustion and may introduce additional air in other ways, provided such introduction does not deflect the flame from its contact with the material.

The jet of fuel and air ordinarily used in present practice is circular in cross section and develops a very high temperature interiorly. The heat is so intense that impingement is out of the question. The temperature in the interior of the flame often exceeds 3000° F., while the temperature required for the production of clinker is only 2300° F. to 2600° F. The direct application of such a high temperature flame to the material would therefore cause overburning of the clinker or lack of uniformity in burning, which would result in a poor cement.

An important feature of operation under my process is that of high speed of rotation given to the kilns in order to raise the material to a high point on one side of the kiln, thereby permitting the flame to be directed toward the side rather than toward the bottom of the kiln. The rapid rotation of the kiln spreads the material over a large surface and allows of a more rapid absorption of heat. Under certain circumstances the speed of the kiln may be so great that the material will be carried in part almost to the highest point in the barrel of the kiln and will drop down and be showered through the flame to the bottom thereof. It has not infrequently been the practice to introduce the fuel jet below the axis of the kiln because of the low speed of rotation employed. Under such circumstances the cold air which always enters to a greater or less degree through the clinker discharge opening and elsewhere, travels along the bottom of the kiln and elevates the flame to such an extent that impingement in any case would be uncertain. By greatly increasing the speed of rotation of the kiln the material is carried up so high on the ascending side that the flame may be raised to a considerable extent and may be directed diagonally across the kiln to a point about the middle of the ascending side. In this manner, even though cold air be drawn into the kiln through the numerous openings at the lower end, such extraneous air will not interfere with the impingement of the flame as the cold current travels along the bottom of the kiln while the flame being much higher up strikes against the side of the kiln and its impingement is in no wise interfered with.

Referring to the accompanying drawings Figure 1 represents a plan view of a rotary cement kiln, Fig. 2 is a longitudinal elevation, Fig. 3 is an end elevation of the clinker discharge portion of the kiln with hood removed, and Fig. 4 is a cross section of a special form of nozzle.

Referring to the drawings, 1 represents a rotary inclined barrel having a dust chamber 2, stack 3 and material feeding apparatus 4.

5 is a hood at the lower end of the kiln, provided with an opening for the discharge of clinker. Space is allowed between the end of the kiln and the hood for expansion.

6 is a fuel feeding pipe of oblong or elliptical cross section so placed that the longer axis thereof preferably is parallel to a tangent at that point in the circumference of the kiln where the material is deepest, as shown by the dotted lines $a$ $a$ and $b$ $b$. This flattened nozzle is arranged to rotate in the sleeve 7 so that it may be directed in the most effective manner. The nozzle is so inclined that the jet of fuel travels diagonally into the kiln and strikes the material along the side walls.

8 is a hopper for the introduction of coal, the latter being supplied by the conveyer 9. A fan blower 10 supplies air for injecting the fuel and supporting combustion. Connection is made from the fuel hopper to the nozzle by the circular pipe 11 which pipe should have practically the same area of cross section as the flattened nozzle, in order that there may be no change in velocity of the fuel-laden air-current during passage from hopper to kiln. The kiln should be rotated at a speed preferably not slower than 2 revolutions per minute but the exact speed is determined to some extent by the character of the material both as regards physical and chemical properties. To permit of such high speed of rotation the inclination of the barrel must be slight, about ¾ of an inch per foot is the greatest inclination permissible under such conditions and I prefer always to work with an inclination of about ¼ to ½ an inch to the foot. In this manner I secure the elevation of the material to so high a point on the ascending wall of the kiln that a jet directed nearly horizontally but diagonally into the kiln will strike positively upon the material and convert it into clinker. By the use of the flattened jet the high temperature developed by the circular jet is no longer apparent. The flame is much flattened, is of a lower but far more uniform temperature throughout and is capable of impinging upon the material and walls of the kiln without injury thereto. By such impingement I secure the development of heat in and around the material, which method of application I have found to be a far more efficient one than that dependent upon radiated heat. My invention therefore secures an economy in fuel and an increased output over present practice and accomplishes this with a minimum cost for apparatus.

Fig. 4 shows a cross section of a curved or boomerang shaped nozzle produced by bending the nozzle above described.

The ordinary cement kiln has an inside diameter or distance between linings of from 5 to 6 feet and to secure the desired elevation of the material upon the ascending side of the kiln a speed of 2 revolutions in 50 or 60 seconds is proper. With kilns 5 feet inside diameter I prefer two revolutions in 50 seconds although as is evident the exact time of revolution is dependent on local conditions such as the nature of the material, quality of coal, time and temperature of its ignition, etc., as well as degree of inclination of the kiln. I regard the elevation of the material to a high point on the ascending side of the kiln to be a most important feature of my invention. Heretofore the methods in practice have been such that air drawn in through the clinker exit prevents the proper impingement of the flame to a large extent. It is obvious that the impingement of the flame high upon the side of the kiln overcomes the difficulty previously experienced through the deflecting and eddying action of extraneous air. The speed of the kiln must be adjusted with reference to the inclination of the kiln and the progressively-advancing mass of cement-forming material should climb up the side of the kiln for at least ⅔ the total possible height of elevation. The high speed produces a tumbling action of the material, not so apparent at the slower commonly used kiln speeds, which tumbling action doubtless assists in the better absorption of the heat and the production of a more uniform clinker. I prefer to have the kiln speed so great that as one looks into the lower end of the kiln through the "patching" hole the descending side of the kiln will be bare of clinker clear to the bottom, or in other words the clinker or other material is almost entirely on the ascending side of the kiln. With a kiln 100 feet in length or thereabout and say 5 feet inside diameter a jet nozzle 10" by 2" in cross section is suitable under usual conditions. The corners of the nozzle may be rounded off if desired making a somewhat elliptical-shaped cross section. The circular feeding pipe for a nozzle of this size should be about 5" in diameter in order to preserve the same area throughout the length of the coal and air passage-way. An air pressure of from 15" to 20" water gage is generally sufficient with such a nozzle to produce proper impingement of flame under ordinary draft conditions. In case preheated air is used instead of air at ordinary temperature it is usually necessary to flatten the nozzle to a greater extent and of course to allow for the attenuation of the air due to increased temperature. The fan air pressure developed is also dependent on the temperature of the gases and with preheated air the fan-blower should be run at a higher speed to compensate for the drop due to diminished density. Heated air increases the flame temperature hence the necessity of broadening or flattening the flame to prevent that internal high temperature which would destroy the kiln "coating." With much flattened nozzles such as those having the shortest diameter of cross section about 2 to 2½ inches trouble from clogging of the nozzle by pebbles, etc. frequently occurs.

The powdered coal should be passed through a rotary sifter or some other suitable device to remove the coarse material before use. This sifting of the coal is an important step heretofore disregarded so far as I am advised and without which a permanently satisfactory flame cannot be produced with small nozzles.

In the clinkering zone the fire brick lining of the kiln is covered with a fused-on layer of material formed in part, so far as I can determine, by the union of the highly basic clinker with the acidic fire brick lining. This covering, known as "coating", is very sensitive to the direct action of the high temperature flame and an impinging flame of circular cross section would speedily remove the coating and then attack the lining so rapidly that the kiln would soon be out of commission. By flattening the coal stream in accordance with my invention a stream or "sheet" of coal and air emanates from the nozzle producing a broad flame having no extremely localized high temperature zone and therefore without deleterious action on the coating.

In certain types of furnace it has been the practice for a great many years to employ an impinging flame with a blast of ordinary air, so far as I am advised. These furnaces are however of a stationary type such as steam boiler generators, billet heating furnaces and the like. In such stationary furnaces an impinging flame circular in cross section does not have to operate under the same conditions as in the rotary inclined cement kiln and therefore the shape of the flame is not the all important consideration. In the cement kiln a progressively-advancing stream of cement forming material is subjected to the action of the flame. Fluctuations in temperature of the flame are disastrous. The action of the flame on the lining is quickly evident if the temperature is too high. The jar and vibration of the kiln due to its rotation makes it necessary that every possible condition be preserved which safeguards the kiln lining. For these and other reasons the impinging flame known in the art as feasible in connection with certain types of furnaces has not been practical in cement burning and my invention now makes possible the use of this most economical type of flame for the commercial manufacture of cement clinker.

What I claim is:—

1. The process of burning cement material in inclined rotary kilns, which consists in spreading the cement material over the upturning side of the kiln to a point within one of the upper quadrants of the kiln, and projecting against and along the material so spread a flame jet which in cross-section is broad in one direction and thin in a direction at right angles, the broad side of the flame turned toward the cement material so spread out and the upper side edge of the flame intersecting the said material.

2. The process of burning cement material in inclined rotary kilns, which consists in spreading the cement material over the upturning side of the kiln to a point within one of the upper quadrants of the kiln, projecting against and along the material so spread a flame jet which in cross-section is broad in one direction and thin in a direction at right angles, the broad side of the flame turned toward the cement material so spread out, and causing the material on the upper edge of layer of cement material to shower down through said flame.

Signed at White Plains in the county of Westchester and State of New York, this 20th day of March A. D. 1906.

CARLETON ELLIS.

Witnesses:
BIRDELLA M. ELLIS,
GODFREY M. HART.